June 8, 1954 C. GAVED 2,680,392
METHOD AND APPARATUS FOR MAKING TURBINE BLADES
Filed Oct. 6, 1949 2 Sheets-Sheet 1

Inventor
Clement Gaved
By
Stevens, Davis, Miller & Mosher
Attorney

June 8, 1954  C. GAVED  2,680,392
METHOD AND APPARATUS FOR MAKING TURBINE BLADES
Filed Oct. 6, 1949  2 Sheets-Sheet 2

Inventor
Clement Gaved
By
Stevens, Davis, Miller & Mosher
his Attorneys

Patented June 8, 1954

2,680,392

UNITED STATES PATENT OFFICE 2,680,392

METHOD AND APPARATUS FOR MAKING TURBINE BLADES

Clement Gaved, Anstey, England, assignor to Power Jets (Research and Development) Limited, London, England, a British company Application October 6, 1949, Serial No. 119,798

Claims priority, application Great Britain October 8, 1948

3 Claims. (Cl. 80—19)

This invention relates to the manufacture of blades for turbines, compressors and similarly bladed fluid flow machines, and also has application to guide blades for use in fluid flow systems, for example, to the individual blades of a cascade in a pipe bend.

The profiles of such blades are arrived at from a consideration of their functions of deriving lift from, or directing, the fluid flow, and of reducing as far as possible their resistance to the flow, and in many instances the performance of a blade is highly critical with respect to its profile in general, and more especially to the part of the profile in the region of the leading and trailing edges of the blade.

In manufacturing such blades the method commonly adopted is to form the material approximately to the desired shape by forging, casting, or partly machining a blank, and to obtain the finished profile by a draw filing or similar operation using a form gauge for reference, the latter step involving considerable time and cost. Moreover, the profile of the leading and trailing edges of a blade are, in general, of a small radius of curvature compared with the remainder of the profile and are very difficult to form correctly by this method since small departures in shape from that of a form gauge are not easily detected; this difficulty is obviously enhanced in the case of blades of a small size.

Furthermore, blades of the kind under consideration do not, in general, lend themselves to the formation of their leading edge by a rotating shaped cutter or grindstone for the following reasons. Firstly the blades, with their profiles partly formed, must be supported and aligned accurately with the cutting tool so that the latter is able to make a correct finishing cut; the difficulties involved in setting up each blade outweigh, to a great extent, the advantages of the method. Secondly, due to the common general form of the blades, that is with thickness small compared with length, they may deflect under pressure from the cutting tool, by an amount sufficient to produce a badly malformed section. A third disadvantage lies in the fact that, in many cases, the blade section varies throughout its length, in respect of size, shape and angle of inclination to the fluid flow, and a rotating cutter of a shape suitable for forming one section of the blade may undercut at other sections.

The object therefore of the present invention is to provide a method whereby the leading edges of blades may be formed quickly to within desired limits of accuracy, and the invention takes advantage of the fact that the remainder of the profile of a blade may be, and indeed commonly is, formed with the desired accuracy before the leading and trailing edges are formed.

The invention proposes that a blade of the kind referred to shall have either its leading or trailing edge, or both, formed to finished size by a swaging or similar action of a tool of appropriate shape causing plastic flow in the material of the blade.

The invention further proposes that the deformation in the material of the blade produced by the action of the tool is effectively controlled by contact between the tool and portions of the blade profile of large radius of curvature by which the edge, itself of small radius of curvature, is bounded.

In the preferred form of the invention it is contemplated that the edge of a blade be shaped by contact with a roller which rotates with translation along the blade edge and has a groove formed in its periphery such that the radial cross-section of the roller groove at any given circumferential point corresponds wholly or partly with the desired cross-section at a point on the blade profile with which the roller groove is momentarily in mutual contact during motion of the roller with respect to the blade.

Thus a partly formed blade may be supported with its leading edge substantially normal to the axis of a roller having an appropriately shaped peripheral groove, so that the roller, when forced against the blade edge and passed one or more times from end to end, will reduce the blade edge to the desired finished size by causing plastic flow in the blade material.

The invention further proposes that the forming tool be free to move in a direction normal to the blade edge. Thus, in the preferred embodiment of the invention, the roller is so arranged as to be able to move axially; by this means the necessity for a high degree of accuracy in setting up the blade with respect to the roller is eliminated provided that the blade profile, excluding, of course, the leading and/or trailing edge, is previously finished, since the axially floating roller may be so arranged as to position itself correctly by contact between the sides of the groove in the roller with the finished profile adjacent to the edge of the blade; similarly, should the blade deflect under pressure from the roller, the latter is enabled to follow up the blade and maintain correct relationship with respect thereto.

In order that the necessity for, and the problems involved in obtaining, the correct profile at the edge of a blade may be more clearly understood, they will now be described, as they apply more particularly to the leading edge, with reference to the accompanying drawings, which illustrate, in part or in whole, various cross-sections of a blade typical of the kind under consideration.

Figure 1:
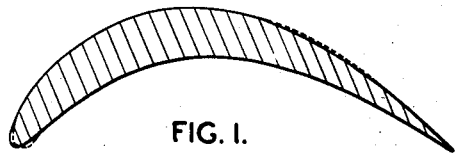
Fig. 1 illustrates a blade in operation.

In Figure 1 the full line represents a blade section designed for operation in a fluid stream flowing in the direction of the arrow A; it will be observed that the leading edge of the section points directly upstream so that the flow of fluid round the section is as smooth as possible; the broken lines indicate errors in the blade section such as might occur in its manufacture. It will be seen that small errors in the profile of the leading edge may result in a section having an inlet angle different to that intended, with consequent disturbance in the fluid stream over the blade, whereas an error of similar magnitude in the portion of the blade profile between the blade edges has less serious results.

Figure 2:
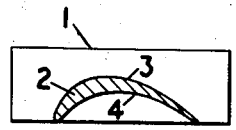
Figs. 2–4 show a common method of machining a blade.
Figures 3, 4:
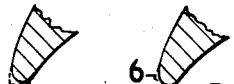

Figure 2 shows on a reduced scale a section through the blade at a stage of manufacture prior to the formation of its leading edge; the blade has been machined from a bar of material of cross-section 1 by a method, commonly used, in which the profile 2 is machined to finish size on each of its sides 3 and 4 where the radius of curvature is large, leaving a quantity of surplus material at the leading edge, as shown enlarged in Figure 3 in which the surplus material is represented by a broken line in relation to the full line of the desired section. The surplus material may be reduced by making a cut tangential to the leading edge, as illustrated at 5 in Figure 4, leaving two small triangular portions 6 and 7 to be blended away to form the correct leading edge profile. As has already been mentioned, the removal of these portions by draw filing or similar means leads to inaccuracies in the profile.

Figures 5, 6:
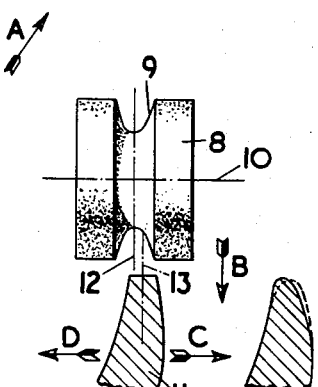
Figs. 5 and 6 represent a common arrangement for finishing a blade by grinding.

An arrangement for finishing the blade by using a rotary cutting tool of suitable shape is illustrated in Figure 5. With reference to the figure, a grindstone wheel 8, having a shaped peripheral groove 9 and rotating about an axis 10, is moved, in relation to the blade section 11, in the direction of the arrow B which conforms with the inlet angle of the blade. The blade section 11 can be correctly finished only if the centre line 12 of the grindstone groove 9 coincides with the centre line 13 of the leading edge of the section; if, as in Figure 5, they are misaligned, the section produced will be as illustrated by the full line in Figure 6 as compared with the broken line of the correct section. A similar defect may occur due to the flexing of the blade (in the direction of the arrows C and D in Figure 5), under lateral pressure exerted by the tool. It is, therefore, apparent that the practical difficulties of this method render it unsuitable for the production of blades on a large scale.

However, by using a method of manufacture according to the invention, the disadvantages of the methods outlined in the foregoing may be avoided, as will be seen from the following description of the preferred form of the invention.

Figure 7:
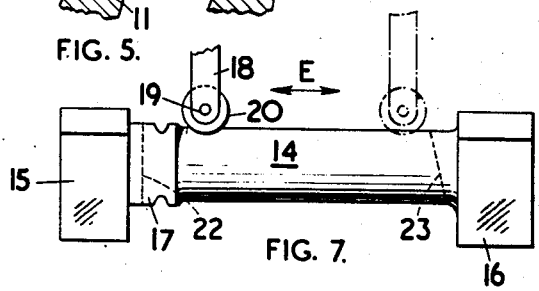
Fig. 7 illustrates the method according to the invention for manufacturing a blade of constant cross-section.
Figure 8:
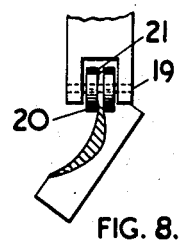
Fig. 8 is a sectional elevation of Fig. 7.

Figure 7 of the accompanying drawings shows an arrangement for use in the manufacture of a blade of constant section throughout its length. With reference to the figure, the blade 14 is partly formed by the method described with reference to Figures 2, 3 and 4, leaving portions 15 and 16 of the bar from which the blade is formed at each end to facilitate the various operations; the blade root portion 17 is also partly formed at this stage. The blade is mounted in a tilted position so that its leading edge is uppermost and is in a horizontal plane, and so that its inlet angle coincides with the vertical, as illustrated in sectional elevation in Figure 8. A carrier arm 18 is disposed above the blade and is adapted so as to be capable of reciprocation in a direction parallel to the leading edge of the blade, as indicated by the arrow E, and also of a small vertical displacement; the carrier arm provides a journal 19 for a roller 20. The roller has a groove 21 formed in its periphery the radial cross-section of which conforms with the desired leading edge profile of the blade for a part of the depth of the groove. The material of the roller 20 is so selected as to be relatively hard compared with that of the blade 14 so that, when the roller is brought into vertical contact with the blade edge under pressure, as in Figures 7 and 8, and the carrier 18 reciprocated in the direction of the arrow E between the positions shown by the full and broken lines respectively, the surplus material on the leading edge of the blade is evenly distributed, and the profile correctly shaped. The resultant effects are firstly that the blade material is locally work-hardened, which is obviously an advantage, and secondly that the chord of the blade is increased by a small amount; in practice the increase is found to lie within the limits of accuracy necessary for the chordal dimension of the blade, and can therefore, be disregarded. The movement of the carrier arm 18 in the vertical direction is limited to the desired amount by suitable stops. The roller 20 may rotate freely or may be driven at any desired speed.

In order to ensure correct alignment of the roller 20 with respect to the leading edge of the blade, the groove 21 is made deeper than is actually required to form the blade edge, so that the radially outermost parts of the sides of the groove make contact with the previously finished portions of the blade profile; by permitting the roller some freedom of movement in the direction of its axis, its correct alignment with the blade is ensured and allowance is thereby made for small machining inaccuracies and flexing in the blade.

After the edge rolling operation the blade is completed by cutting away the end portions 15 and 16 (as indicated by the broken lines 22 and 23).

Although the foregoing description has confined itself to the case of a blade produced by machining, it is apparent that the method is, for the greater part, applicable to blades produced by other means, for example, by forging or casting, followed by an operation preparing them for the formation of their leading edges.

Figure 9:
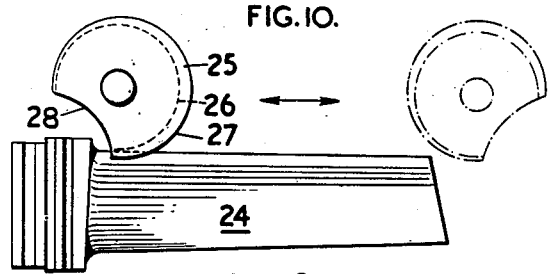
Fig. 9 shows the method of the invention as applied to a blade whose section varies throughout its length.

The method may, with slight modification, be applied to a blade whose section varies throughout its length. Figure 9 illustrates a blade 24 of tapering section the leading edge of which is to be formed. As before, the blade having been brought to the requisite stage of manufacture, a grooved roller 25 is passed over the leading edge, reciprocating between the positions shown in full line and broken line respectively. In order to provide for the varying blade section, however, the radial cross-section of the roller groove varies, in this case, at varying points on the circumference, and the roller rotates only by an amount, and at a speed, appropriate for a running contact between the groove and the blade edge. The bottom of the groove is concentric with the axis of the roller, as represented by the broken line 26, so that the blade may be mounted with its leading edge parallel to the path of reciprocation of the roller, whilst the roller periphery 27 may be of any form depending on the varying depth of the groove; in the present case, for convenience, the periphery 27 forms part of a circle eccentric to the roller axis. The length of the groove around the roller periphery will be approximately the same as the length of the blade; a gap 28 is provided in the periphery between the ends of the groove to clear the blade root when the roller is at the root end of a blade. In order to ensure that the blade and roller are kept in their correct relative positions, the roller spindle may carry a pinion, having a pitch diameter the same as the mean diameter of the roller groove, engaging a rack which is fixed with respect to the blade. In this, as in the previously described form, the roller may be permitted some freedom of lateral movement, and in either case the reciprocal movement may, of course, be applied to the blade itself, instead of to the roller.

Figure 12:
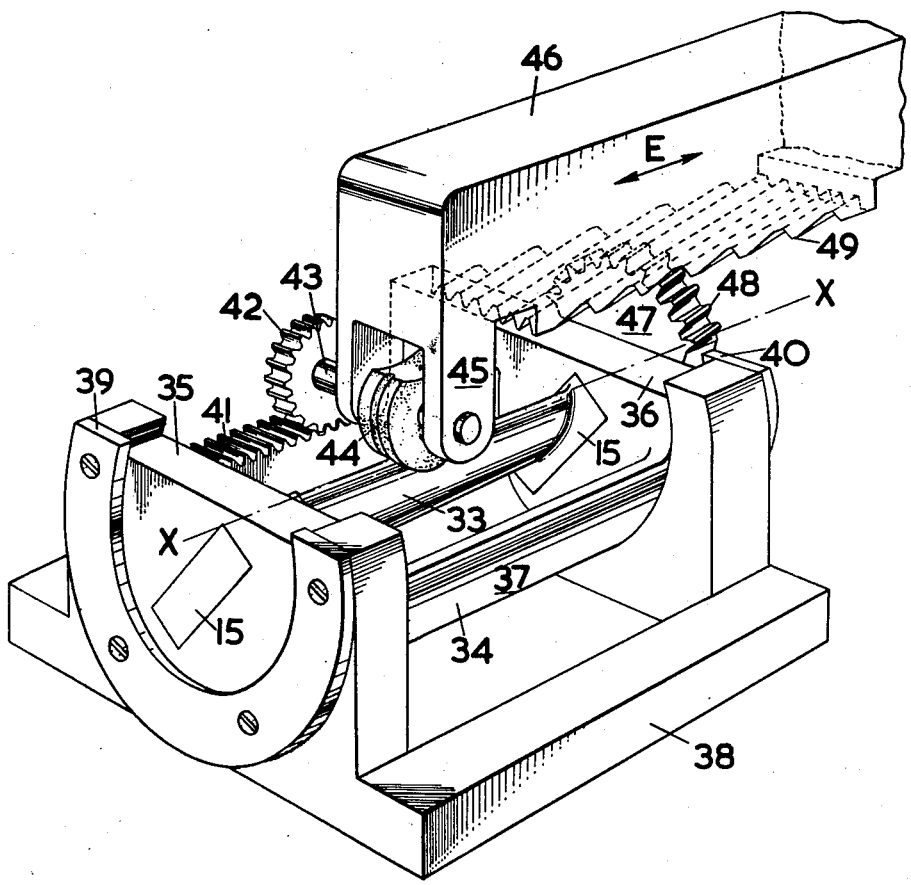
Fig. 12 represents an apparatus for applying the method of Fig. 9 to a blade with a varying inlet angle.

Although the method described in the previous paragraph is intended primarily for use in manufacturing blades of varying section, it is contemplated that it will also have application to blades of varying inlet angle. Provided that the variation in the inlet angle were small, the blade could be mounted with its mean inlet angle vertical and its leading edge, as before, parallel to the roller path. The variation in the inlet angle could then be accommodated by the changing section of the groove. If however, the variation were large, this method would be impracticable due to the fact that the amount of the leading edge profile to which the groove conformed at one section would be limited by the inlet angles of other sections. In forming such a blade, therefore, the method would require modification in that the blade would have to describe a rotational movement, relative to the roller, about a longitudinal axis simultaneously as the roller reciprocated over it, so that the inlet angle of any given section would be substantially vertical at the moment when the roller passed. The rotational axis of the blade would preferably pass through a point in each section close to or near the centre of curvature of the leading edge, and the roller might require more lateral movement than in the case of a fixed blade. The rotational movement of the blade, would, of course, be geared to and synchronised with the roller reciprocating mechanism. Figure 12 shows such an embodiment of the invention in which a partly formed blade 33 is mounted in a swivel mounting 34 comprising two part-cylindrical end blocks 35 and 36 connected by a part-cylindrical shell 37, the end blocks embracing end portions 15 of the blade. The swivel mounting is supported on a trunnion block 38 having two trunnions affording part-cylindrical bearing surfaces for the end blocks 35 and 36 and so providing for swiveling of the mounting 34, the arrangement being such that the swiveling takes place about an axis XX along the edge of the blade which is to be formed. The swivel mounting 34 is located axially in the trunnion block 38 by locating flanges 39, 40 one of which, 39, is detachable to permit the insertion of the swivel mounting into the trunnion block. A toothed rack 41 integral with the trunnion block is engaged by a pinion 42 drivingly attached to the roller shaft 43 which is in turn drivingly attached to the edge forming roller 44 which is similar to the roller 28 shown in Figure 9. The roller shaft is mounted so as to be freely rotatable in a fork 45 on a roller arm 46 which is adapted for reciprocation in the direction of the arrow E. Thus the rotation of the roller is geared to its reciprocal movement in the precise manner already described. The roller shaft is also free to move axially in the form 45 thereby affording limited free axial movement of the roller as also already described. The pinion 42 is axially slidable on the rack 41 to accommodate such movement. The swivel mounting 34 is provided with an integral quadrant 47 arranged coaxially therewith having skewed teeth 48 formed around its periphery. These teeth engage a complementarily toothed rack 49 (shown in broken line) formed on the underside of the roller arm 46. This gearing of the quadrant 47 with the rack 49 ensures that the blade is rotated in synchronism with reciprocal movement of the roller as already described.

Figure 10:
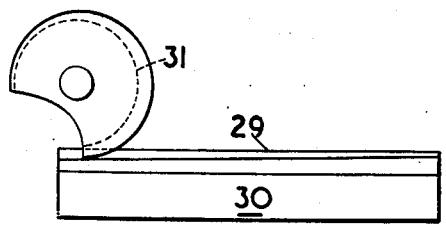
Figs. 10 and 11 illustrate a method of forming a roller groove suitable for use in the methods of Fig. 7 and Fig. 9.
Figure 11:
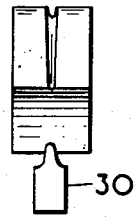

In the first of the embodiments described, the groove in the roller may be formed by turning or a similar operation; for the roller of the other embodiments, however, this is not possible. A method of forming the roller groove suitable for all cases is illustrated in Figures 10 and 11 of the accompanying drawings and will now be described with reference thereto. One edge 29 of a piece of steel 30 is worked by hand to the form of the blade edge desired in this case of tapered section, and is hardened to form a master pattern. It is then mounted on a reciprocable table over which, mounted on a suitable spindle, is the roller 31, in which is to be machined the leading edge form; the roller 31 is geared to the table in the manner described with reference to Figure 9, so that the roller 31 and the master pattern 30 are maintained in their correct relationship. As steady pressure is applied in the downward direction to the roller, the blade edge is reciprocated with respect thereto thus pressing the form from the hardened master pattern 30 into the roller which at this stage is of soft metal. The roller is then hardened and finished, when it is ready for use. When large numbers of similar blades are required, several rollers may be made from the same master pattern.

When producing the rollers for manufacturing blades of varying inlet angles, the method would be modified; in the case where the variation is small the master pattern would be mounted with its mean inlet angle vertical, and when the variation is large the master pattern would be subjected to the same rotational movement as is ultimately to be applied to the blades whilst under the roller.

Although the embodiments of the invention described have dealt specifically with the case of the formation of the leading edge of a blade, it is apparent that they are in many respects equally suitable for forming the trailing edges of blades.

I claim:

1. Apparatus for forming an edge of a blade for a turbine, compressor or similarly bladed fluid flow machine, comprising means for mounting the blade under manufacture, a reciprocable tool carrier for translating a grooved tool longitudinally of said blade with the groove of the tool in edge-embracing relationship to the blade, said tool carrier affording means whereby said tool is freely displaceable in a direction laterally of said blade edge.

2. Apparatus for forming an edge of a blade for a turbine, compressor or similarly bladed fluid flow machine, comprising blade mounting means, a grooved roller adapted for reciprocal movement normal to and for freedom of movement along its rotational axis with respect to said blade mounting means, means for synchronizing rotation of the roller with such reciprocal movement, means for rotating said blade mounting means about an axis extending in the direction of reciprocation of the roller, and means for synchronizing such rotation with the reciprocal and rotational movements of the roller.

3. The manufacture of a blade for a turbine compressor or similarly bladed fluid flow machine having a profile an edge of which, being itself of small radius of curvature, is bounded by portions of relatively large radius of curvature, including the method of forming said edge of the profile by the steps of constraining toward the blade in the edge-on direction a unitary swaging tool having a groove of appropriate shape which embraces the blade edge, and translating said tool longitudinally of the blade to produce, without the cooperation of any complementary forming tool, local deformation of the blade, during said translation of the tool the blade under manufacture moves relatively to the tool rotationally about a longitudinal axis of the blade, said translational and rotational movements being synchronized.

References Cited in the file of this patent

UNITED STATES PATENTS

| Number | Name | Date |
|---|---|---|
| 960,161 | De Ferranti | May 31, 1910 |
| 1,614,040 | Nelson | Jan. 11, 1927 |
| 2,150,416 | Cairns | Mar. 14, 1939 |